J. B. TURNER & J. S. BRISCOE.
MOWING MACHINE.
APPLICATION FILED DEC. 28, 1912.
1,089,292.
Patented Mar. 3, 1914.
2 SHEETS—SHEET 2.
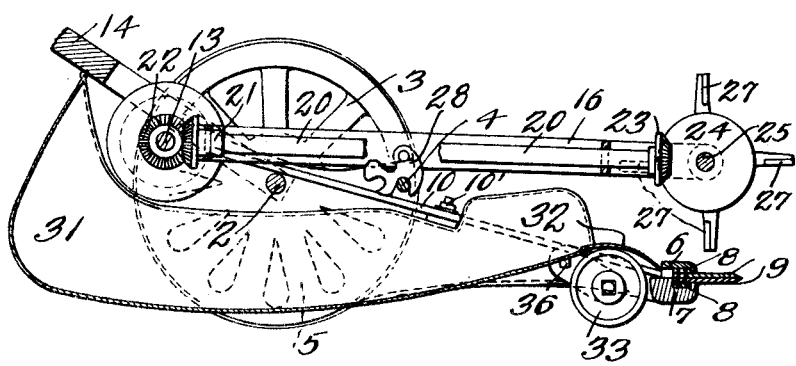
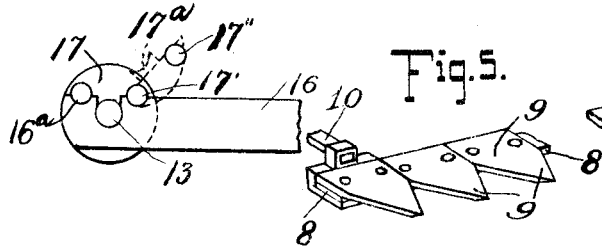
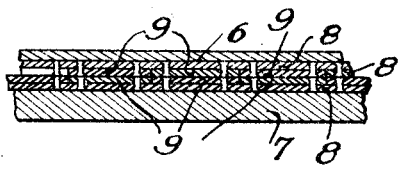
Witnesses
C. H. Wagner.
J. W. Kirkeby
Inventors
John B. Turner
John S. Briscoe
By Robb & Robb
Attorneys.

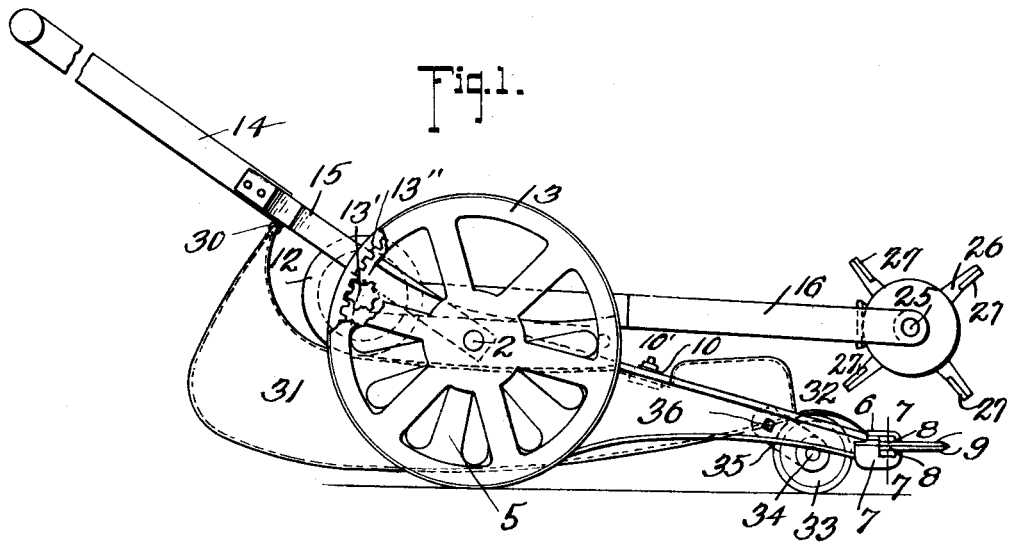
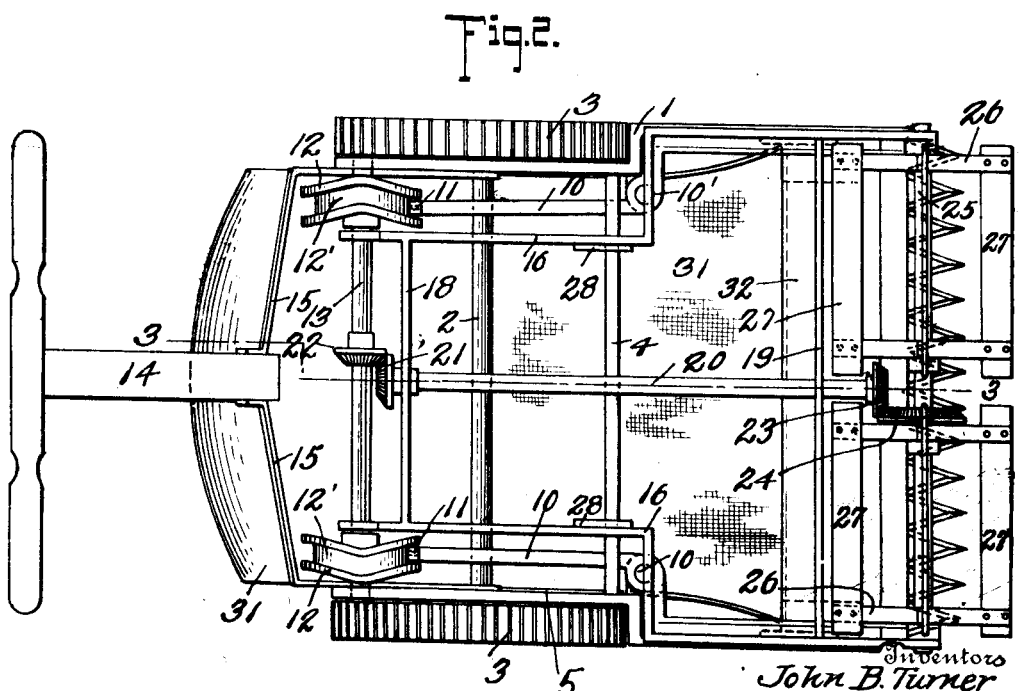

UNITED STATES PATENT OFFICE.

JOHN B. TURNER AND JOHN S. BRISCOE, OF OKMULGEE, OKLAHOMA.

MOWING-MACHINE.

1,089,292.
Specification of Letters Patent.
Patented Mar. 3, 1914.

Application filed December 23, 1912. Serial No. 729,063.

*To all whom it may concern:*

Be it known that we, JOHN B. TURNER and JOHN S. BRISCOE, citizens of the United States, residing at Okmulgee, in the county of Okmulgee and State of Oklahoma, have invented certain new and useful Improvements in Mowing-Machines, of which the following is a specification.

The present invention embodies improvements in mowing machines, and relates particularly to that type known as lawn mowers, the main object in view being to provide a machine of this character adapted to cut grass, weeds, and similar vegetation, so constructed as to afford the maximum cutting force or power, and at the same time permitting ease and smoothness of action.

A further object of this device is to provide means capable of adjustment, according to the character of vegetation operated upon, for forcibly removing said vegetation from the cutting elements, preferably into a receptacle carried by the machine, said means being detachably connected to and operatively connected with the operating mechanism for the cutting elements.

For a full understanding of the present invention, reference is to be had to the following detail description and to the accompanying drawings, in which—

Figure 1 is a side elevation of a machine constructed in accordance with the invention, a portion being broken away to show the operative connection for the driving shaft. Fig. 2 is a top plan view. Fig. 3 is a vertical longitudinal sectional view taken about on the line 3—3 of Fig. 2. Fig. 4 is an enlarged detail view of the spring catch for connecting the auxiliary frame to the reel operating shaft. Figs. 5 and 6 are fragmentary perspective views of the lower and upper sickle bars, respectively, showing the preferred connection of the sickle levers thereto. Fig. 7 is a partial sectional view somewhat enlarged, taken on the line 7—7 of Fig. 1. Fig. 8 is an enlarged view of a dog for adjusting the height of the auxiliary frame.

Throughout the following detail description and on the several figures of the drawings, similar parts are referred to by like reference characters.

A machine constructed in accordance with the present invention embodies a main frame 1, of somewhat rectangular shape, and mounted near one end on the axle 2, which has in turn loosely mounted upon its extremities the ground or drive wheels 3. The frame 1 is preferably provided with at least one transverse supporting rod 4 secured in the upper portion of the side or guard plates 5, and its particular function will be hereinafter more clearly set forth. In the forward end of the frame 1, between the guide plates 6 and 7, are mounted in superposed relation the sickle bars 8, 8, each of which is composed of a plurality of sickle blades 9, riveted, or similarly secured thereto. The sickle bars 8, 8 are adapted to be reciprocated in opposite directions, having detachably connected to their outer ends, the angular or sickle levers 10, which are pivotally mounted at 10' at each side of the frame 1. These levers incline upwardly from the forward end of the machine and are preferably provided at their rear extremities with roller bearings 11 which project into the zig-zag cam groove 12' formed in the peripheries of the wabble or cam wheels 12, there being one of said wheels secured near each end of an operating or driving shaft 13. This shaft 13 has its bearings in the frame 1 and is operatively connected by means of the gears 13' to the internal peripheral gears 13'' of the drive wheels 3, as most clearly shown in Fig. 1 of the drawings.

The usual handle 14 is provided for operating the machine, and is connected to the axle 2 by means of the diverging brace rods 15.

From the foregoing it will be seen that motion is transmitted from the drive wheels 3 to the operating shaft 13, through the cam wheels 12 to the levers 10, the grooves 12' being of such form that complete reciprocation is imparted to each of the sickle bars 8, 8 in opposite directions, in one revolution of the wheels 12, thereby providing a shearing action which, by reason of the leverage and form of said grooves, is of considerable cutting power so that any character of vegetation likely to be met with will yield readily to the cutting elements thus provided.

The machine, as above described, is complete in itself but we prefer to employ in conjunction with the cutting mechanism, means for removing the vegetation as it is cut away from the cutting elements. To this end, we have provided an auxiliary frame 16 of the same general shape as the main frame 1 and said auxiliary frame is detachably and pivotally connected to the operating shaft 13 at its rear end by means of the spring catches 17, most clearly shown in Fig. 4 of the drawings. Said catches preferably consist of a piece of wire bent into the shape shown in dotted lines of Fig. 4 and pivotally mounted at one side of the shaft upon a lug 17' carried by the auxiliary frame 16 and formed at its free end with an eye 17'' adapted to be engaged over a projection 16ᵃ on the other side of the shaft 13 whereby the catch at its intermediate portion 17ᵃ will bear against said shaft, thereby holding the auxiliary frame in position upon the operating shaft aforesaid. The frame 16 is provided with transverse bars 18 and 19 at the rear and forward portion of said auxiliary frame and in these transverse bars is journaled a driving shaft 20 extending longitudinally of the machine and having a beveled pinion 21 at its rear extremity intermeshing with a similar pinion 22 secured to the operating shaft 13 while, at its forward end, the shaft 20 has another beveled pinion 23 intermeshing with a pinion 24 secured to the reel shaft 25 which has its bearings in the forward end of the auxiliary frame 16 and carries the rotating members or reels 26. These reels 26 are fixedly secured to the shaft 25 and comprise a plurality of paddles 27.

It will, of course, be desirable to adjust the reels 26 vertically or toward and from the cutting elements over which they are suspended, according to whether the vegetation is long or short, and for this purpose we provide supporting means for the auxiliary frame 16 in the form of adjustable dogs 28, most clearly shown in Fig. 8 of the drawings, there being one dog at each side of said frame to which they are pivotally secured. These dogs 28 are formed with a plurality of notches 29 which are adapted to engage over the transverse supporting rod 4 of the main frame 1, the shape of the dogs or, in other words, the depth of the notches 29 being so regulated as to raise or lower the front end of the auxiliary frame 16, thereby bringing the reels 26 closer or farther away from the cutting elements therebeneath.

To the handle 14 is suspended at 30, in rear of the cutting elements, a suitable grass receiving receptacle 31, said receptacle being provided at its front portion with an apron 32 detachably secured to the forward end so that the grass is swept by the reels 26 against the cutting elements and then into said receptacle. It is obvious that the receptacle and auxiliary frame with its reel may be used or dispensed with at the will of the operator in the use of this machine, each of said parts being capable of easy detachment from the same.

At the forward end of the machine, and preferably directly in rear of the cutting elements are provided at each side of the main frame 1, caster wheels 33 which are mounted upon stub shafts 34 projecting inwardly from the lower ends of adjusting plates 35. These plates are secured to the main frame by means of the adjusting bolts 36 so that when it is desired to regulate the height of the cutting elements, the adjusting bolts 36 may be loosened and the proper height secured for the cutting elements in accordance with the character of vegetation to be operated upon.

It is to be noted that the detachable connection between the forward ends of the sickle levers 10 and sickle bars 8 may be pivotal or any other desired form, permitting relative movement of these parts, but the preferred embodiment of the same is most clearly shown in Figs. 5 and 6 of the drawings.

Having thus described the invention, what is claimed as new is:

1. In a machine of the class described for cutting grass, or the like, the combination with a main frame and drive wheels, of an operating shaft operatively connected with the drive wheels, cutting elements carried by said frame, cam wheels carried by the operating shaft and having grooved peripheries, levers pivotally mounted upon the frame and connected at one end to the cutting elements and having their other end projecting into the grooved peripheries of the cam wheels whereby reciprocation in opposite directions is imparted to the cutting elements, the main frame aforesaid having a transverse rod, an auxiliary frame connected at one end to the operating shaft, and having its other end suspended over the cutting elements, rotating members mounted at the opposite end of the auxiliary frame, and means secured to said auxiliary frame and adapted to engage with the transverse rod of the main frame to hold the auxiliary frame in its suspended position and to regulate the height of said rotating members.

2. In a machine of the class described, the combination of a main frame, an auxiliary frame supported above said main frame, drive wheels mounted in the main frame, cutting mechanism carried by the main frame, means operatively connected with the drive wheels for actuating the cutting mechanism, a reel rotatably mounted in the auxiliary frame, a driving shaft journaled in the auxiliary frame and operatively connected with the operating means for the cutting mechanism and the reel, and a notched dog pivotally secured to the auxiliary frame and adapted to engage with the main frame to support and adjust the height of the auxiliary frame.

3. In a machine of the class described, the combination of a main frame, an auxiliary frame pivotally mounted for extension above the main frame, drive wheels mounted in the main frame, cutting mechanism carried by the main frame, means operatively connected with the drive wheels for actuating the cutting mechanism, a reel rotatably mounted in the auxiliary frame and operatively connected with the operating means for the cutting mechanism, and dogs pivotally mounted on the auxiliary frame and having notches therein arranged at varying distances from the pivot of each dog so as to permit the auxiliary frame to be held at different heights when said dogs are engaged with the main frame.

In testimony whereof we affix our signatures in presence of two witnesses.

JOHN B. TURNER.
JOHN S. BRISCOE.

Witnesses:
J. E. SCHILLING,
CHAS. L. PHILLIP.